United States Patent Office 3,028,400
Patented Apr. 3, 1962

3,028,400
NEW STEROID THIOETHERS AND PROCESS
FOR THEIR MANUFACTURE
Heinrich Ruschig, Bad Soden (Taunus), Werner Haede,
Hofheim (Taunus), and Werner Fritsch, Frankfurt am
Main, Germany, assignors to Farbwerke Hoechst Aktiengesellschaft vormals Meister Lucius & Brüning,
Frankfurt am Main Hochst, Germany, a company of
Germany
No Drawing. Filed Mar. 17, 1960, Ser. No. 15,521
Claims priority, application Germany Mar. 21, 1959
6 Claims. (Cl. 260—397.1)

The present invention relates to new steroid-21-yl-mercaptocarboxylic acids of the general formula

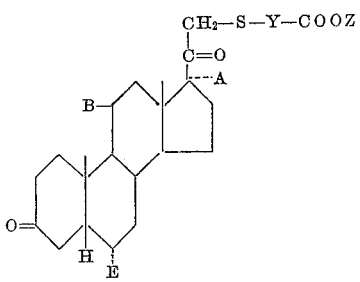

wherein A is a hydrogen atom or a hydroxy group, B represents hydrogen, oxygen or the hydroxy group, E represents a hydrogen atom or the methyl group, Y is an alkyl radical of low molecular weight which, if desired or necessary, may be substituted by an amino group, and Z represents a hydrogen atom or an alkali metal, and their corresponding $\Delta^4$- and $\Delta^{1,4}$-unsaturated analogs.

The products of the present invention constitute valuable medicaments; in particular their alkali metal salts are easily water-soluble and are distinguished by excellent stability.

The present invention furthermore relates to the manufacture of these new steroid-21-yl-mercaptocarboxylic acids of the general formula

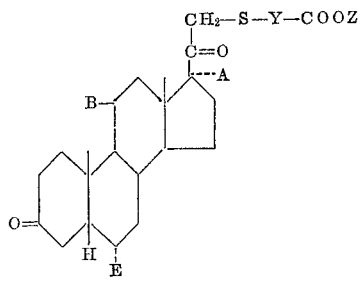

wherein A is a hydrogen atom or a hydroxy group, B represents hydrogen, oxygen or the hydroxy group, E represents a hydrogen atom or the methyl group, Y stands for an alkyl radical of low molecular weight which, if desired, may be substituted by an amino group, and Z represents a hydrogen atom or an alkali metal, and their corresponding $\Delta^4$- and $\Delta^{1,4}$-unsaturated analogs that can be obtained by introducing a radical of the general formula

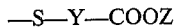

—S—Y—COOZ into a compound, or a corresponding $\Delta^4$- or $\Delta^{1,4}$-unsaturated derivative of this compound, corresponding to the general formula

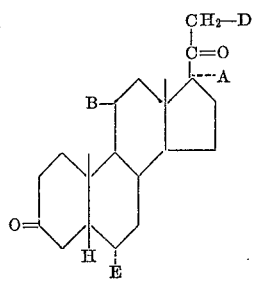

in which formulae the radicals A, B, E, Y, and Z have the meanings given above and D represents a halogen atom or the mesyl group, while splitting off the radical D.

As starting substances, there may, for example, be used the halides or sulfonic acid esters of the following steroids:

$\Delta^4$-pregnene-21-ol-3,20-dione,
$\Delta^4$-pregnene-17α,21-diol-3,11,20-trione,
$\Delta^4$-pregnene-11β,21-diol-3,20-dione,
$\Delta^{1,4}$-pregnadiene-17α,21-diol-3,11,20-trione,
$\Delta^4$-pregnene-11β,17α,21-triol-3,20-dione,
$\Delta^{1,4}$-pregnadiene-11β,17α,21-triol-3,20-dione,
$\Delta^{1,4}$-pregnadiene-6α-methyl-11β,17α,21-triol-3,20-dione,
$\Delta^{1,4}$-pregnadiene-16α-methyl-11β,17α,21-triol-3,20-dione, as well as their 9-halogen derivatives, fluorine being used preferentially. Furthermore, there enter into consideration the corresponding steroids of the pregnane series.

As mercaptocarboxylic acids, which, according to the process of the invention, may be reacted in the form of their mono- or di-alkali metal salts or in the form of their esters and mono-alkali metal salts with the aforementioned steroid derivatives there enter into consideration: mercaptoacetic acid, β-mercaptopropionic acid, γ-mercaptobutyric acid, and the corresponding mercaptoaminocarboxylic acids, for example, cysteine. The di-alkali metal salts of the mercapto acids are suitably prepared by causing them to react with a calculated amount of an alkali metal alcoholate. Upon evaporation of the solvent they solidify in crystalline form and can be pulverized and dried in the vacuum drier. The mono-alkali metal salts of the mercaptocarboxylic acid esters are suitably prepared by causing the free mercaptocarboxylic acid esters to react with a suspension of one mol of an alkali metal alcoholate in benzene. These mono-alkali metal salts are relatively unstable and sensitive to moisture so that they can be stored for a short period only, for example, over sulfuric acid in the desiccator. The reaction of the steroid-21-halides or steroid-21-sulfonic acid esters with the mono-alkali metal salts of mercaptocarboxylic acid esters can be varied within wide limits and adjusted to the conditions prevailing. With solutions or suspensions, for example, it can be carried out by heating the reaction mixture under reflux. As solvents or suspending agents there enter into consideration, for example: acetone, methanol, tetrahydrofurane, dioxane, dimethylformamide, and the mixtures thereof, with or without the addition of water. The operation is suitably carried out at a moderately elevated temperature, preferably at the boiling point of the solvent or dispersing agent used; the reaction may, however, also be carried out at room temperature. The reaction period may extend, depending on the reaction conditions, from 2 to 30 minutes. The hydrolization of the steroid-21-yl-mercaptocarboxylic acid esters obtained is suitably carried out by heating under reflux in the presence of alkalies.

According to another preferred method of carrying out the process of the present invention the steroid-21-halides or steroid-21-sulfonic acid-esters serving as starting substances, preferably the 21-chloro- or 21-mesyl-derivatives can also be reacted with a mixture of mono- and/or di-alkali metal salts of the mercaptocarboxylic acids, the position of the mercapto groups with regard to the carboxylic groups being without importance for the succeeding of the reaction. The operation is conveniently carried out by dissolving the free mercaptocarboxylic acid, which is preferably used in an excess over the steroid, in an aliphatic alcohol of low molecular weight such, for example, as methanol or ethanol, and in adding the solution with 1.5 to 2 times the molar quantity of an alkali metal alcoholate (referred to the mercaptocarboxylic acid used). To the reaction mixture so produced is then added, while mechanically stirring, a solution or a suspension of the steroid-21-halide or the -21-sulfonic acid ester. The use of dispersing agents is not absolutely required, but the steroid-21-halide or the 21-sulfonic acid ester may also be introduced in solid, preferably in finely powdered state. The reaction proceeds at room temperature with evolution of heat and is generally terminated after a few minutes. When large quantities are concerned, it is necessary to operate with external cooling. The completion of the reaction can be easily observed by that a specimen of the reaction mixture dissolves clearly in water.

When the reaction is carried out with aminomercaptocarboxylic acids, for example, with cysteine, there may also be used the corresponding salts thereof, for example, the cysteine-hydrochloride. In this case it is advantageous to use larger amounts, for example 2–3 mol equivalents, preferably 2, 6 mol equivalents, of alkali metal alcoholate. Also in this embodiment of the invention it is of advantage to use an excess of amino acids over the steroid-21-halides or steroid-21-sulfonic acid esters.

Otherwise, the reaction is carried out in accordance with the aforementioned reaction conditions. This embodiment yields as reaction product directly the alkali metal salts of the steroid-21-yl-mercaptocarboxylic acid which, if desired, can be converted into the corresponding free acids in the usual manner by acidification.

The free steroid-21-yl-mercaptocarboxylic acids obtained according to the first described method of the process of the invention can be converted into the corresponding alkali metal salts in the usual manner by neutralization with dilute alcoholic sodium hydroxide solution.

The products obtained by the process constitute valuable steroid hormones, the alkali metal salts of which are distinguished by a good water-solubility and good stability. The compounds can easily be made into aqueous solutions of, for example, 30% strength, which are heat-sterilizable.

As regards the therapeutical properties of the novel products, for example, the $\Delta^{1,4}$-pregnadiene-11$\beta$-17$\alpha$-diol-3,20-dione-21-yl-$\beta$-mercaptopropionic acid, is, due to its glucocorticoid hormone effectiveness and very good solubility in water, very well suitable for parenteral application in life-menacing collapses or shocks. The $\Delta^4$-pregnene-3,20-dione-21-yl-mercaptoacetic acid, for example, may be used for the treatment of the morbus Addison and adrenal insufficiency.

The sodium salt of the $\Delta^4$-pregnene-3,20-dione-21-yl-$\beta$-mercapto-$\alpha$-aminopropionic acid, for example, is distinguished by its bacteriostatic activity on numerous gram-positive and gram-negative germs.

The derivatives of the pregnane series, such as pregnane-3,20-dione-21-yl-$\beta$-mercaptopropionic acid are highly effective narcotics as, for example, the pregnane-3,20-dione-21-ol-hemisuccinate; they have over the hemisuccinates the advantage of being substantially better stable in aqueous solutions.

The products of the present invention can be applied as free acids as well as in the form of their corresponding alkali metal salts. They can advantageously be applied in the form of galenic preparations, for example, as tablets, capsules, dragees, ampoules, oily or aqueous solutions or suspensions, in admixture with physiologically tolerated, non-toxic, pharmaceutically usual, inorganic or organic carrier substances.

For the preparation of such galenic preparations there may be used such compounds as do not react with the compounds of the present invention, for example, water, gelatine, bolus, lactose, starch, magnesium stearate, talcum, tylose, vegetable oils, such as olive oil, peanut oil, castor oil, furthermore cotton seed oil and neat's foot oil, gum, propylene glycol, polyethylene glycol, zinc oxide, titanium di-oxide, and other customary carriers. The products of the present invention or the corresponding galenic preparations may be sterilized and/or may contain auxiliaries, such as stablizers, buffer substances, wetting agents, emulsifiers or salts influencing the osmotic pressure. The galenic preparations are prepared according to the usual methods.

The following examples illustrate the invention but they are not intended to limit it thereto:

EXAMPLE 1

$\Delta^4$-Pregnene-3,20-Dione-21-yl-Mercaptoacetic Acid (a) 13 g. of potassium-mercaptoacetic acid methyl ester are suspended in 150 cc. of acetone and after addition of 10 g. of $\Delta^4$-pregnene-3,20-dione-21-yl-chloride (prepared by the reaction of $\Delta^4$-pregnene-3,20-dione-21-ol with methane sulfochloride), 1 g. of mercaptoacetic acid methyl ester and 0.5 g. of sodium iodide, stirred for 30 minutes and at 30–40° C. in an atmosphere of nitrogen. 120 cc. of the acetone are then distilled off and after addition of 200 cc. of water the reaction mixture is adjusted to a pH of 6.5 by means of acetic acid. After having allowed the reaction mixture to stand over night in the refrigerator, the liquid is removed from the crystal cake and the residue is hydrolysed for 4 hours under reflux with a mixture of 100 cc. of tetrahydrofurane, 100 cc. of water and 5 g. of potassium carbonate. The tetrahydrofurane is removed by distillation and the aqueous solution is filtered until clear, at room temperature, through a layer of charcoal (about 2 g. of active charcoal). By slowly adding 2 N-hydrochloric acid, drop by drop and while intensively stirring, the reaction mixture is acidified to a pH of 4. There crystallize out 9.6 g. of $\Delta^4$-pregnene-3,20-dione-21-yl-mercaptoacetic acid melting at 185° C.

(b) 10 g. of $\Delta^4$-pregnene-3,20-dione-yl-chloride are suspended with 15 g. of di-potassium-mercaptoacetic acid in 50 cc. of di-methylformamide and stirred for 20 minutes at 40° C. The reaction mixture is cooled and added with 600 cc. of cold water. This solution is clarified with charcoal and adjusted to a pH of 4 by slowly adding, while stirring, 2 N-hydrochloric acid. Thereupon the $\Delta^4$-pregnene-3,20-dione-21-yl-mercaptoacetic acid crystallizes out. After vacuum filtration, washing and drying at 50° C. under reduced pressure, the product is obtained in a yield of 10.5 g. Its melting point is at between 185 and 187° C.

EXAMPLE 2

$\Delta^4$-Pregnene-3,20-Dione-21-yl-$\beta$-Mercaptopropionic Acid 8 g. of $\Delta^4$-pregnene-3,20-dione-21-yl-chloride are suspended with 12 g. of the di-potassium salt of $\beta$-mercaptopropionic acid in 36 cc. of dimethylformamide and the suspension is stirred for 20 minutes at 50° C. The suspension is allowed to cool to +5° C. and then added with 400 cc. of cold water. The solution is clarified with charcoal and slowly adjusted to a pH of 4 by adding, while stirring, 2 N-hydrochloric acid. Thereupon, the $\Delta^4$-pregnene-3,20 - dione - 21 - yl-mercaptopropionic acid crystallizes out. The product melts at 157° C.

EXAMPLE 3

*Pregnane-3,20-Dione-21-yl-Mercaptoacetic Acid*

11.7 g. of pregnane-3,20-dione-21-yl-chloride in finely pulverized state are introduced, while mechanically stirring, into a suspension consisting of 21 g. of freshly prepared potassium mercaptoacetic acid methyl ester, 63 cc. of dimethylformamide and 1.7 cc. of mercaptoacetic acid methyl ester. After having stirred for about 20 minutes, the reaction mixture is cooled to 10° C. and introduced into 300 cc. of ice-cold water. The reaction mixture is then adjusted to a pH of 5 by means of acetic acid. The pregnane - 3,20 - dione-21 - yl-mercaptoacetic acid methyl ester which at first separates in the form of an oil soon solidifies in crystalline form. After filtering and washing with water there are obtained 12.5 g. of pregnane-3,20-dione-21-yl-mercaptoacetic acid methyl ester which can be reacted without further purification.

12.5 g. of the crude pregnane-3,20-dione-21-yl-mercaptoacetic acid-methyl ester are dissolved in 350 cc. of methanol and after having been heated added with a solution of 10 g. of sodium carbonate in 160 cc. of water. After having boiled under reflux for one hour the methanol is evaporated. The aqueous solution remaining behind is extracted with ether in order to remove a weak turbidity. The aqueous phase is then adjusted to a pH of 4–5 by means of acetic acid. The completely crystallized product which precipitates after some standing is sucked off, washed with water and dried. There are obtained 9.5 g. of pregnane-3,20-dione-21-yl-mercaptoacetic acid of a melting point of 115 to 117° C.

5.37 g. of pregnane-3,20-dione-21-yl-mercaptoacetic acid are dissolved in 100 cc. of methanol and added with 133 cc. of 0.1 N-sodium hydroxide solution. After elimination of the methanol by evaporation under reduced pressure, the aqueous solution is subjected to lyophilization. The yield of pregnane-3,20-dione-21-yl-mercaptoacetic acid sodium salt is quantitative. 1 g. of the sodium salt so obtained dissolves at room temperature in 1.1 cc. of water.

EXAMPLE 4

*$\Delta^4$-Pregnane-17$\alpha$-ol-3,11,20-Trione-21-yl-Mercaptoacetic Acid*

2.34 g. of $\Delta^4$-pregnene-17$\alpha$-ol-3,11,20-trione-21-yl-chloride (obtained by the reaction of $\Delta^4$-pregnene-17$\alpha$,21-diol-3,11,20-trione with methane sulfochloride) are added, while stirring intensively, to a suspension of 4.2 g. of the disodium salt of mercaptoacetic acid in 12 cc. of dimethylformamide. After having stirred for eight minutes, the reaction mixture is cooled to 10° C. and added with 40 cc. of water. The resulting clear solution is adjusted to a pH of 4 by means of 2 N-hydrochloric acid. The $\Delta^4$-pregnene-17$\alpha$-ol-3,11,20-trione-21-yl-mercaptoacetic acid that is thereby precipitated crystallizes after some standing. After vacuum filtration, washing with water and drying, the product is recrystallized from methylene chloride/ether (melting point 179 to 180° C.). The yield is 2.1 g. The free acid can be converted into the sodium salt according to the method described in Example 3.

EXAMPLE 5

*$\Delta^{1,4}$-Pregnadiene-11$\beta$,17$\alpha$-Diol-3,20-Dione-21-yl-Mercaptoacetic Acid*

4.2 g. of disodium salt of the mercaptoacetic acid are reacted, as described in Example 4, with 2.34 g. of $\Delta^{1,4}$-pregnadiene-11$\beta$-17$\alpha$-diol-3,20 - dione-21-yl-chloride (obtained by reaction of $\Delta^{1,4}$-pregnadiene-11$\beta$,17$\alpha$-diol-3,20-dione with methane sulfochloride). The yield after the recrystallization from methanol amounts to 2.53 g.; the melting point is 136° C. The sodium salt can be prepared by using the method described in Example 3.

EXAMPLE 6

*$\Delta^4$-Pregnene-3,20-Dione-21-yl-$\beta$-Mercapto-$\alpha$-Aminopropionic Acid*

2.42 g. of cysteine are dissolved in 10 cc. of methanol and added with 10.5 cc. of a sodium methylate solution containing per cc. 54.3 mg. of sodium. After cooling to 20° C. the so formed suspension of the cysteine-disodium salt is added with 1.75 g. of 21-chloro-progesterone. After having stirred for 12 minutes, 100 cc. of water are added, a clear solution being formed. The solution is adjusted to a pH of 6 by means of 2 N-acetic acid. The resulting crystalline deposit is vacuum filtered, washed with a small quantity of water, well triturated with 15 cc. of acetone and vacuum filtered again. There are obtained 1.8 g. of $\Delta^4$-pregnene-3,20-dione-21-yl-$\beta$-mercapto-$\alpha$-amino-propionic acid melting at 159° C. (with decomposition). The compound is easily soluble in hot water, dilute hydrochloric acid or a solution of sodium bicarbonate.

EXAMPLE 7

*Pregnane-3,20-Dione-21-yl-$\beta$-Mercaptopropionic Acid*

4.91 g. of 21-chloro-pregnane-3,20-dione are reacted according to the method described in Example 6 with a solution of 2.8 g. of the disodium- and 1.4 g. of the monosodium salt of $\beta$-mercapto-propionic acid in 23 cc. of methanol. The crude product is recrystallized from acetone petrol ether. There are obtained 5.2 g. of pregnane-3,20-dione-21-yl-$\beta$-mercapto-propionic acid having a melting point of 105–107° C. The compound is well soluble in a sodium bicarbonate solution.

EXAMPLE 8

*$\Delta^{1,4}$-Pregnadiene-3,20-Dione-11$\beta$,17$\alpha$-Diol-21-yl-$\beta$-Mercapto-Propionic Acid*

3.54 g. of 21-chloro-$\Delta^{1,4}$-pregnane-3,20-dione-11$\beta$,17$\alpha$-diol are reacted according to the method described in Example 6 with a solution of 3.03 g. of the di-sodium salt of $\beta$-mercapto-propionic acid in 20 cc. of methanol. After recrystallization of the crude product from methanol there are obtained 3.8 g. of 1,4-pregnadiene-3,20-dione-11$\beta$,17$\alpha$-diol-21-yl-$\beta$-mercapto-propionic acid having a melting point of 204° C.

EXAMPLE 9

*$\Delta^{1,4}$-Pregnadiene-3,20-Dione-11$\beta$,17$\alpha$-Diol-21-yl-$\beta$-Mercapto-$\alpha$-Aminopropionic Acid*

7.7 g. of 21-chloro-$\Delta^{1,4}$-pregnadiene-11$\beta$,17$\alpha$-diol-3,20-dione are added to a solution of 5.35 g. of cysteine-hydrochloride in 26 cc. of methanol which has been added at room temperature, with 38 cc. of a sodium methylate solution containing per cc. 54 mg. of sodium. After having stirred for 6 minutes, the reaction mixture is added with 60 cc. of water. After some standing in ice-water, the crystallized sodium salt of the $\Delta^{1,4}$-pregnadiene-3,20-dione-11$\beta$,17$\alpha$-diol-21-yl-$\beta$-mercapto - $\alpha$ - aminopropionic acid is vacuum filtered and washed with a small amount of ice-cold water. After drying in the vacuum at 35° C. the yield of sodium salt amounts to 8.3 g. For further purification the sodium salt is dissolved in 250 cc. of hot water. After having cooled to 45° C., the solution is added with 1 cc. of glacial acetic acid. Upon some standing at 0° C. the precipitate crystallizes. It is filtered off and washed with a small quantity of water. After drying in the vacuum at 35° C., there are obtained 6.4 g. of $\Delta^{1,4}$-pregnadiene - 3,20 - dione - 11$\beta$,17$\alpha$-diol-21-yl-$\beta$-mercapto-$\alpha$-aminopropionic acid having a melting point of 180° C. (with decomposition). When concentrating the aqueous mother liquor under reduced pressure, there can be obtained a further 0.7 g. of the free acid.

EXAMPLE 10

*Pregnane-3,20-Dione-21-yl-β-Mercapto-α-Amino-propionic Acid*

2.42 g. of cysteine hydrochloride are dissolved in 10 cc. of hot methanol, cooled and added with 6.64 cc. of sodium methylate solution (69.5 mg. sodium per cc.). 1.7 g. of 21-chloropregnane-3,20-dione are then introduced with stirring. After having stirred for 14 minutes, further 3.66 cc. of the above sodium-methylate solution diluted with 10 cc. of methanol are added. After a further 2 minutes 150 cc. of water are admixed, while stirring. 10 cc. of a 0.7% dilute acetic acid are then poured into the clear solution. The pregnane-3,20-dione-21-yl-β-mercapto-α-aminopropionic acid thereby precipitated is vacuum filtered after standing for some time under ice-cooling and washed with a small quantity of ice-cold water. After drying in the vacuum at 35° C. the yield of free acid is 1.81 g. of pregnane-3,20-dione-21-yl-β-mercapto-α-aminopropionic acid. Melting point: 190° C. (decomposition).

EXAMPLE 11

*$\Delta^{1,4}$-Pregnadiene-3,20-Dione-11β,17α-Diol-21-yl-β-Mercapto-α-Amino-Propionic Acid*

7.47 g. of 21-mesyl-$\Delta^{1,4}$-pregnadiene-11β,17α-diol-3,20-dione are introduced into a solution of 4.48 g. of cysteine-hydrochloride in 15 ml. of methanol that has been added at room temperature with 19.4 cc. of a sodium methylate solution containing per cc. 88.7 mg. of sodium. After having stirred mechanically for 10 minutes at room temerature, the reaction mixture is added with further 3.08 cc. of sodium methylate solution. After further 10 minutes the reaction mixture is adjusted to a pH of 5–6 by adding dilute acetic acid. The deposited precipitate is vacuum filtered and washed with water. There are obtained 6.9 g. of $\Delta^{1,4}$-pregnadiene-3,20-dione-11β,17α-diol-21-yl-β-mercapto-α-amino-propionic acid which can be processed according to the method described in Example 9.

We claim:

1. A member of the group consisting of steroid-21-yl-mercapto-carboxylic acids of the general formula

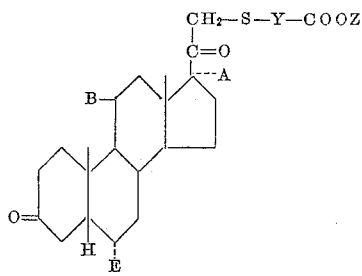

in which A is a member selected from the group consisting of hydrogen and hydroxy, B is a member selected from the group consisting of hydrogen, oxygen and hydroxy, E is a member selected from the group consisting of hydrogen and methyl, Y is a member selected from the group consisting of alkylene radicals containing from 1 to 3 carbon atoms and mono-amino substituted alkylene radicals containing from 1 to 3 carbon atoms, and Z is a member selected from the group consisting of hydrogen and alkali metals, and their $\Delta^4$- and $\Delta^{1,4}$-unsaturated analogs.

2. The compound of the formula

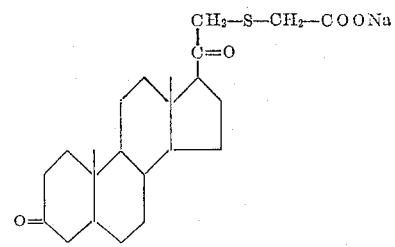

3. The compound of the formula

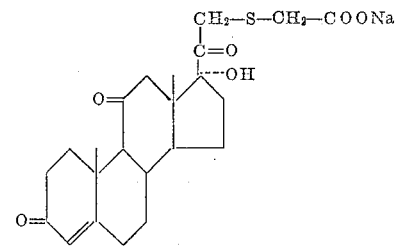

4. The compound of the formula

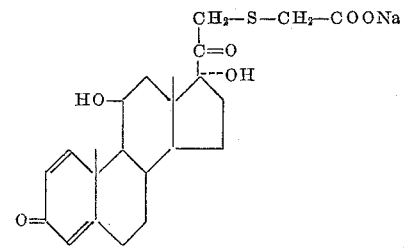

5. The compound of the formula

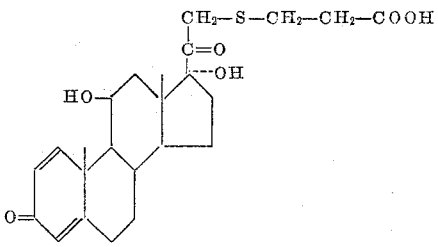

6. The compound of the formula

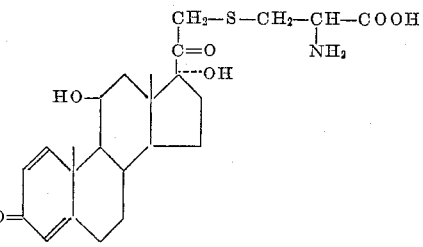

References Cited in the file of this patent

UNITED STATES PATENTS

| | | |
|---|---|---|
| 2,814,632 | Nussbaum | Nov. 26, 1957 |
| 2,878,157 | Bloom | Mar. 17, 1959 |

OTHER REFERENCES

Gilman: Organic Chemistry, An Advanced Treatise, vol. 1, 2nd ed., page 854, Wiley & Sons (N.Y.—1953).